Patented Feb. 28, 1933

1,899,576

UNITED STATES PATENT OFFICE

PAUL C. LEMMERMAN, OF EAST CLEVELAND, AND RAYMOND F. REMLER, OF LAKEWOOD, OHIO, ASSIGNORS TO THE GRASSELLI CHEMICAL COMPANY, OF CLEVELAND, OHIO, A CORPORATION OF DELAWARE

METHOD OF PROTECTING CONCRETE SURFACES DURING CURING

No Drawing. Application filed November 13, 1930. Serial No. 495,418.

The strength and quality of concrete, such as used in highways and floor construction, depend on a number of factors, among which is the proper protection during the early setting, or curing, of the concrete by a covering which will prevent excessive evaporation and loss of the water contained in the cement mixture as laid.

One of the common methods used for this protection is to cover the surface with a layer of earth or straw which is continuously kept moist by sprinkling with water. This is a rather cumbersome and expensive procedure, and it has extensively been replaced by applying to the freshly laid concrete surface various chemicals or their solutions. Some of these chemicals prevent excessive evaporation of the water contained in the fresh concrete by sealing the surface; others, due to their hygroscopic nature, attract moisture to the surface of the concrete.

Sodium silicate solutions are extensively used for this purpose. Such solutions are applied in concentrations up to a density of about 36° Bé., and the grade of sodium silicate preferred has a ratio of $Na_2O$ to $SiO_2$ of about 1 to not less than 3.2 by weight. The application of sodium silicate to concrete during the curing period usually comprises protecting the surface with wet burlap for the first 24 hours, after which a sodium silicate solution of the above concentration is brushed upon the concrete, where, upon drying it seals the pores of the surface and thereby reduces the evaporation of the mixing water during the curing period.

We have found that the quality of the seal produced by the slow evaporation of a sodium silicate solution brushed upon concrete surfaces is improved if the solutions contains, besides caustic alkali and silicic acid, small amounts of another electrolyte, and our invention comprises protecting concrete surfaces during curing by applying thereto a solution of sodium silicate containing small amounts of an electrolyte.

It is, for the understanding of the present invention, unnecessary to assume or discuss any of the various theories relating to the composition of the various ingredients which make up sodium silicate solutions. It suffices to know that the addition to sodium silicate solutions of substantial amounts of non-caustic electrolytes, that is to say those which are salts or acids in aqueous solution, precipitates silicic acid.

Sodium silicate solutions will, however, tolerate small amounts of such precipitating electrolytes without precipitating silicic acid and our invention contemplates the use of sodium silicate solutions containing non-caustic electrolytes in amounts insufficient to precipitate silicic acid from the solution.

The amounts of non-caustic electrolytes which can be added to sodium silicate solutions without precipitating silicic acid vary with the composition, concentration of the solution and with the nature of the electrolyte. While, for instance, 8% of a 36% hydrochloric acid will precipitate, or cause to settle out, silicic acid from a 33% Bé. solution of a 1:3.2 ratio, 1% will not do so, similarly, ½% concentrate sulfuric acid will not precipitate, while 4% will do so at room temperature. (20 to 30° C.)

Additions to sodium silicate which do not cause silicic acid to settle out of solution will hereinafter be termed "non-precipitating" without any implications as to the chemical reactions which may take place between the electrolyte and the ingredients of the silicate solution.

Sodium silicate solutions containing non-precipitating amounts of non-caustic electrolytes were found by us when applied to uncured concrete, to seal the pores of the concrete in less time than straight sodium silicate solutions applied under the same conditions.

We also found that the so obtained seals were less pervious to water vapor and that concrete surfaces protected by such seals during curing lost less of their water by evaporation in a given time than surfaces protected by a seal obtained from straight sodium silicate.

The concrete surfaces cured while protected by a seal obtained from sodium silicate solutions containing non-precipitating amounts of non-caustic electrolytes showed no detrimental effect from the action of the modified silicate and were in excellent condition.

We have added the following non-caustic electrolytes in the amounts stated to sodium silicate solutions of approximately 33° Bé. of the ratio 1Na$_2$O to 3.2 SiO$_2$ (by weight) and found that no silicic acid settled out of the solution under ordinary conditions. These solutions, when spread on green concrete, set in one-fifth to two-thirds of the time required for straight sodium silicate solutions of the same gravity and produced seals on the concrete surfaces which efficiently protected said surfaces during curing:

|  | Per cent |
|---|---|
| Glacial acetic acid | 1½ |
| Glacial acetic acid with the addition of from ½ to 2% glycerine | 1 |
| Oxalic acid crystals | 1 |
| Formic acid, 90% | 1 |
| Benzoic acid | ½ |
| Sodium acetate crystals | 4 |
| Sodium benzene sulfonate | 1 |
| Sodium alginate | 4 |
| Phenol | 1 |
| Crude calcium lignin sulfonate | 2 |
| Hydrochloric acid, 36% | 2 |
| Concentrated phosphoric acid | 1 |
| Concentrated sulfuric acid | 1 |
| Sodium nitrate | 4 |
| Sodium chloride | 4 |
| Tri-sodium phosphate hydrate | 3 |
| Calcium chloride | ½ |
| Aluminum chloride crystals, and others | ½ |

The amounts stated are based upon the weight of the sodium silicate solution. They do not necessarily represent maximum amounts tolerated by the sodium silicate and on the other hand, smaller amounts have produced similar effects.

We also found that among the non-caustic electrolytes added in non-precipitating amounts to sodium silicate solutions, weak acids, particularly weak organic acids, were among the most efficient in protecting the uncured concrete.

One may consider that the addition of said weak acids to sodium silicate solutions changes the Na$_2$O to SiO$_2$ ratio. We do not believe, however, that such a change is the main factor determining the improved quality of the seal produced. On the one hand, a sodium silicate solution of a ratio corresponding to such possible change does not show the improvement; on the other hand, the addition of alkali-metal salts or other water soluble salts of the same acids, where there will be no change of ratio, produces substantially the same improvement.

Acetic acid and sodium acetate in amounts up to about 2% were found by us to be among the most desirable electrolytes to be added to sodium silicate solutions for use in protecting concrete surfaces during the curing period.

It is, of course, understood that acids, such as acetic acid, etc., added to a sodium silicate solution do not appear in the solution as free acids, and when we speak herein of sodium silicate solutions containing acid we are merely conveying the idea that the sodium silicate solution has been modified in its seal forming properties by the addition of acid thereto, and that the solution contains the reaction product, whatever that is, produced by said addition.

It is rather difficult to estimate quantitatively the improvements obtained by various treatments in situ of concrete surfaces during curing. Various laboratory methods are known which deal with the moisture retention during curing, flexural and compressive strength, crack formation, permeability and resistance to wear, etc., of the resulting concrete. We found when applying these methods to test pieces of concrete cured with protection according to our invention, that the results compare very favorably with other protecting means and that they are in all instances superior to the results obtained with straight sodium silicate solution.

The preparation of our modified sodium silicate solutions is easily effected by adding the requisite amount of acetic acid or other non-caustic electrolyte to a concentrated sodium silicate solution. It is advisable to efficiently stir the solution, as otherwise local high concentration of the electrolyte may precipitate silicic acid, though in most instances curds which precipitate will easily redissolve on continued agitation. The viscosity of the modified silicate solutions may be different from that of the original solutions, but as such concentrated solutions are usually diluted to some degree, for instance to 33 or 36° Bé., for spreading upon concrete surfaces, the desired viscosity can easily be obtained.

The modified solutions are applied to concrete surfaces in exactly the same manner as ordinary silicate solutions. The solution is, for instance, flushed on the surface with a bucket and broomed uniformly over the surface with a soft, pliable push broom, using, for example, 1 pound of the solution per square yard, or by any other convenient method as well known in this art. It is not necessary to use sodium silicate solutions of exactly 36° Bé. for application to curing concrete roads. Similarly, we can use more concentrated modified solutions or dilute our silicate, containing electrolytes according to our invention, to a lesser gravity, such as 25, 20 or even as low as 10° Bé., and obtain a good protection of concrete surfaces during curing, though with dilute solutions more than one application may be required.

We claim:

1. The method of protecting a concrete surface during curing which comprises applying to said surface a sodium silicate solution containing a non-precipitating amount of a non-caustic electrolyte.

2. The method of protecting a concrete surface during curing which comprises applying to said surface a sodium silicate solution containing a weak organic acid in an amount insufficient to precipitate silicic acid from said solution.

3. The method of protecting a concrete surface during curing which comprises applying to said surface a sodium silicate solution containing a small amount of acetic acid.

4. The method of protecting a concrete surface during curing which comprises applying to said surface a sodium silicate solution containing an amount of sodium acetate insufficient to precipitate silicic acid from said solution.

5. The method of protecting a concrete surface during curing which comprises applying to said surface a sodium silicate solution containing an amount of a water soluble salt insufficient to precipitate silicic acid from said solution.

6. The method of protecting a concrete surface during curing which comprises forming a seal for the pores of said surface by applying thereto, before completion of the cure, a sodium silicate solution containing a non-precipitating amount of a non-caustic electrolyte.

In testimony whereof, we affix our signatures.

PAUL C. LEMMERMAN.
RAYMOND F. REMLER.